Patented Nov. 25, 1941

2,264,173

UNITED STATES PATENT OFFICE 2,264,173

EMULSION POLYMERIZATION OF CHLORO-2-BUTADIENE-1,3 IN THE PRESENCE OF SULPHUR

Arnold M. Collins, Wilmington, Del., assignor to E. I. du Pont de Nemours & Company, Wilmington, Del., a corporation of Delaware No Drawing. Application April 26, 1938, Serial No. 204,305

18 Claims. (Cl. 260—32)

This invention relates to the polymerization of chloro-2-butadiene-1,3 hereinafter, for convenience, called chloroprene. More particularly it relates to improved methods for polymerizing chloro-2-butadiene-1,3 while it is in a dispersed state.

The emulsification of chloroprene and its polymerization in that state to obtain a synthetic latex is disclosed in Collins U. S. Patent No. 1,967,861. This patent includes a disclosure of a variety of methods for carrying out this polymerization but does not anywhere specifically describe the process hereinafter disclosed.

It is an object of this invention to produce polymers of chloroprene having novel and improved properties. A more specific object is to provide dispersions of polymerized chloroprene from which useful rubber articles having improved properties may be produced. A further object is to produce polymers of chloroprene which may be readily plasticized. Another object is to produce sulphur-containing polymers of chloroprene by a more convenient method than mass polymerization. A still further object is to produce polymers of chloroprene which are substantially free from odor. Other objects will appear hereinafter.

These objects are accomplished by polymerizing chloroprene while dispersed in an aqueous medium in the presence of sulphur. The dispersion medium may be acid, neutral, or alkaline but is preferably neither strongly acid nor strongly alkaline.

According to a preferred procedure, chloroprene, in which a small amount of sulphur has been dissolved, is dispersed in water containing a small amount of emulsifying agent. The dispersion is then ready for polymerization which may be effected in a variety of ways as is hereinafter more fully pointed out.

The varied embodiments of this invention are illustrated in the following examples. It should be understood, however, that these examples are intended to be illustrative only and are not intended to limit the scope of the invention. The term "parts," whenever hereinafter used, signifies parts by weight.

The following examples are given in two tables depending on whether these latices are to be used directly for the production of elastic articles and coatings or are to be coagulated and plasticized for example according to the method disclosed and claimed by Youker in a copending application, Serial No. 204,362, filed April 26, 1938, which method comprises incorporating into the latices a compound of the general formula R—S—R$_1$ in which R is alkyl, aryl, thiazyl, thiocarbamyl, aromatic acyl or aromatic thioacyl group and R$_1$ is hydrogen, a base forming radical, or a group represented by —S$_n$—R$_2$, in which $n$ is a whole number less than 4 and R$_2$ is one of the group represented by R above, and then subjecting the polymer to conditions adapted to develop plastic properties. It should be understood, however, with the exception noted below, that the polymer dispersions prepared especially for the direct production of elastic articles may also be used for conversion into plastic products and vice versa. Examples 1 and 34 are given to show the effect of the omission of sulphur and are not embodiments of the present invention.

In carrying out the examples given in Table I, 100 parts of chloroprene in which the quantities of impurities do not substantially exceed those given in the discussion below and in which the quantity of sulphur indicated in the table has been dissolved, is emulsified by gradual addition, with the rapid mechanical agitation secured by repeated passage through a centrifugal pump, to the indicated quantity of an aqueous solution containing the indicated emulsifying agent. Further variations in the process are given in footnotes to the table. The dispersion is then maintained, in a vessel which can be externally heated or cooled, at the indicated temperature until the polymerization is substantially complete, as is shown by the rise in density of the dispersion (measured at 20° C.) to about 1.10 in the cases where 100 parts of water are used or correspondingly higher for a more concentrated dispersion. The approximate times required for this reaction are indicated but since they vary somewhat even when conditions are closely duplicated, it will be found more accurate to end the operation when the proper density has been reached rather than after a given time. The use of density determinations is further discussed below. After the addition of 1.25 part of ethyl betanaphthylamine (dispersed in a small additional amount of the dispersing solution) and also 0.73 part of 29% aqueous ammonium solution in all but Examples 11 and 12, the latex is ready for storage or use. In order to test the physical properties of the polymers formed, films may be formed by immersing cups of unglazed porcelain wet with dilute ammonia in the latex, applying suction to the interior of the cups until a layer of coagulated polymer of the desired thickness has been built up on the outside of the cups, withdrawing the cup from the latex, partly drying the film, stripping it from the cup, and heating in air for 30 minutes at 140° C. Tensile strengths and elongations at break of films prepared in this way from the products of the various examples are given in the last two columns of the table.

of phenyl-beta-naphthyl-amine and one part of tetramethyl thiuram disulphide, dispersed in ten additional parts of the emulsifying solution with the aid of eight parts of benzene. The latex is then coagulated by addition of saturated sodium chloride solution with the further addition of ethyl or butyl alcohol in Examples 28, 46, and 49 where coagulation is difficult with salt alone, according to the method disclosed by Calcott and Youker in their application Serial No. 181,602, filed December 24, 1937. The resulting coagulated polymer is then plasticized by the method disclosed by Youker in his above identified copending application and at the same time washed and dried by working it first under running water at 50° C. on a mill with corrugated rolls for from 20 to 30 minutes and then on a smooth mill at 50° C. for an additional 20 or 30 minutes with the addition of 0.5 part of phenyl-beta-naphthyl-amine and 0.5 part of tetramethyl thiuram disulphide, until it has reached constant weight. The plasticity numbers and regains of the plasticized polymers are given in Table II. In these examples and throughout this application, whenever the term "plasticity number" is used, it refers to the thickness in thousandths of an inch of a sample 2.5 cc. in volume in the form of a cylinder

TABLE I

| Ex. No. | Emulsifying agent | Amount | Water | Sulphur | Temp. | Time | Tensile strength | Elongation at break |
|---|---|---|---|---|---|---|---|---|
| | | | | | °C. | Hours | Lbs./sq. in. | Per cent |
| 1 | Na oleate | 2 | 100 | 0.0 | 25 | 23 | 2,200 | 960 |
| 2 | ----do---- | 2 | 100 | 1.0 | 25 | 23 | 2,650 | 1,240 |
| 3 | Na "Lorol" [1] sulphate | 2 | 100 | 0.5 | 25 | 20 | 2,725 | 850 |
| 4 | Na oleate (1 pt.)+Na "Lorol" sulphate (1 pt.) | 2 | 100 | 0.5 | 25 | 20 | 3,175 | 1,010 |
| 5 | Na "Lorol" su.phate | 2 | 100 | [2] 0.5 | 40 | 4 | 3,125 | 1,140 |
| 6 | Na abietate (+0.25 part NaOH) [5] | 4 | 100 | [2] 0.25 | 40 | 6 | 3,275 | 1,250 |
| 7 | Na "Lorol" sulphate [3] | 2 | 67 | [2] 0.5 | 25 | 20 | 2,825 | 1,120 |
| 8 | Na "Lorol" sulphate [3] | 2 | 67 | [2] 0.5 | 40 | 4 | 2,775 | 1,140 |
| 9 | Na "Lorol" sulphate | 2 | [4] 100 | [2] 0.5 | 25 | 20 | 1,625 | 1,400 |
| 10 | Na salt of sulphated oleyl acetate | 2 | 100 | 1.0 | 25 | 20 | 2,650 | 1,080 |
| 11 | Cetyl trimethyl ammonium bromide | 2 | 100 | 1.0 | 25 | 20 | 2,425 | 1,050 |
| 12 | C-cetyl betaine [5] | 2 | 100 | 0.5 | 40 | 6 | 2,600 | 1,320 |

[1] "Lorol" is a mixture of straight chain aliphatic alcohols, with an average chain length of about 13 carbon atoms, made from cocoanut oil.
[2] The chloroprene also contains 2 parts of hexahydrophenol and 0.5 part of paraffin.
[3] The solution also contains, in addition to the 2 parts of the emulsifying agent named above, 1 part of the Na salt of the acid obtained by condensing naphthalene sulphonic acids with formaldehyde according to U. S. Patent 2,046,757.
[4] Ten parts of the chloroprene replaced by 10 parts of dichloro-2,3-butadiene-1,3.
[5] The solution also contains 0.25 part (NH$_4$)$_2$S$_2$O$_8$.

Table II gives the examples of the production of latices particularly suitable for the production of plastic polymers by the method disclosed by Youker in his copending U. S. application already referred to. One hundred parts of chloroprene in which the quantities of impurities do not substantially exceed those given in the discussion below and containing the indicated quantities of dissolved sulphur, and other agents is emulsified in the indicated quantity of an aqueous solution containing the indicated emulsifying and other agents as shown in Table II. The emulsification and polymerization are carried out as described for Examples 1 to 12 in Table I. The course of the polymerization is followed by determining the density of the dispersion, which is approximately a linear function of the proportion of chloroprene which has polymerized. The density corresponding to any given yield of polymer may accordingly be calculated from the densities of the starting materials and of the polymer or may be read from an experimentally determined graph. When the density corresponding to the yield given in the table is reached, further polymerization is arrested by the addition of one part ⅝ inch in diameter which has been heated to 80° C. for 15 minutes and then kept under a weight of 5 kilograms for 3 minutes at 80° C. Thus, the lower the "plasticity number," the greater is the plasticity. The term "regain" or "recovery" whenever hereinafter used, refers to the increase in thickness of the compressed sample which takes place in one minute on removing the compressing weight and allowing the sample to return to room temperature. Table II also gives the tensile strength obtained after compounding these plastic polymers with five parts of wood rosin, five parts of zinc oxide, and ten parts of light calcined magnesia per 100 parts of plastic polymer and curing in a press for 10 minutes at 151° C. It should be understood that the part of the above general process which involves the formation of plastic polymers by the addition of tetramethyl thiuram disulphide and milling does not form part of the present invention but is described in detail and claimed in the copending application of Youker. These plastic polymers are discussed here to illustrate the suitability of the latices obtained in Examples 13 to 49 for use in Youker's process.

TABLE II—PART A

| Ex. No. | Emulsifying agent | Amount | Water | Sulphur | | Temp. °C. | Time Minutes | Yield Per cent | Plasticity number and regain | Tensile strength Lbs./sq. in. |
|---|---|---|---|---|---|---|---|---|---|---|
| 13 | Na oleate | 3.0 | 300 | 1.0 | | 40 | 60 | 56 | 53–1 | 3,075 |
| 14 | ___do___ | 3.0 | 300 | 1.0 | | 40 | 180 | 84 | 92–0 | 3,450 |
| 15 | ___do___ | 3.0 | 300 | 0.5 | | 40 | 100 | 90 | 130–10 | 4,125 |
| 16 | Na stearate | 4.5 | 300 | 1.0 | | 40 | 90 | 85 | 85–1 | 3,425 |
| 17 | Na naphthenate | 3.0 | 300 | 1.0 | | 40 | 2,880 | 66 | 100–4 | 2,925 |
| 18 | Na hydroabietate (+0.25 part NaOH) | 4.0 | 300 | 0.5 | | 40 | 380 | 85 | 81–4 | 4,125 |
| 19 | Na hydroabietate (+0.25 part NaOH) | 4.0 | 300 | 0.5 | | 30 | 1,440 | 80 | 75–1 | 4,050 |
| 20 | Na hydroabietate (+0.25 part NaOH) | 4.0 | 300 | 0.75 | | 60 | 90 | 79 | 125–9 | 3,525 |
| 21 | Na hydroabietate (+0.25 part NaOH) | 4.0 | 300 | 0.5 | Bz₂O₂ ___ 0.05 | 40 | 130 | 90 | 93–4 | 4,275 |
| 22 | Na hydroabietate (+0.13 part NaOH) | 4.0 | 300 | 0.5 | Na₂S₂O₈(¹) ___ 0.05 | 40 | 50 | 87 | 112–8 | 4,125 |
| 23 | Na hydroabietate (+0.13 part NaOH) | 4.0 | 300 | 1.0 | Na₂S₂O₈(¹) ___ 0.05 | 40 | 60 | 87 | 103–7 | 3,800 |
| 24 | Na abietate (+0.13 part NaOH) | 4.0 | 300 | 0.5 | Na₂S₂O₈(¹) ___ 0.05 | 40 | 240 | 84 | 108–8 | 4,525 |
| 25 | Na abietate (+0.25 part NaOH) | 4.0 | 233 | 0.75 | (NH₄)₂S₂O₈(¹) 0.5 | 40 | 120 | 90 | 74–3 | 4,475 |
| 26 | Na isopropylnaphthalene sulphonate | 3.0 | 300 | 1.0 | | 40 | 80 | 90 | 147–12 | 3,200 |
| 27 | Na abietene sulphonate | 3.0 | 300 | 1.0 | | 40 | 60 | 88 | 128–12 | 3,425 |
| 28 | Na salt of sulphonic acid from cetane ² | 4.0 | 233 | 0.75 | | 40 | 65 | 88 | 90–2 | 4,275 |
| 29 | Na salt of sulphonated petroleum | 4.0 | 233 | 0.75 | | 40 | 50 | 94 | 111–2 | 4,650 |
| 30 | Na "Lorol" ³ sulphate | 3.0 | 300 | 1.0 | | 40 | 105 | 86 | 142–16 | 3,800 |
| 31 | Na abietyl sulphate | 3.0 | 300 | 1.0 | | 40 | 80 | 78 | 103–4 | 3,450 |
| 32 | Turkey red oil | 3.0 | 300 | 1.0 | | 40 | 140 | 90 | 115–8 | 3,625 |
| 33 | Na salt of sulphated methyl ricinoleate | 3.0 | 300 | 1.0 | | 40 | 165 | 82 | 102–5 | 4,050 |
| 34 | Na salt of sulphated oleyl acetate | 8.0 | 400 | 0.0 | | 40 | 17 | 87 | 231–152 | 1,325 |
| 35 | ___do___ | 8.0 | 400 | 1.0 | CS₂ ___ 10.0 | 40 | 30 | 90 | 124–16 | 3,775 |

TABLE II—PART B

| Ex. No. | Emulsifying agent | Amount | Water | Sulphur | Other agents | Temp. °C. | Time Minutes | Yield Percent | Plasticity number and regain | Tensile strength Lbs./sq. in. |
|---|---|---|---|---|---|---|---|---|---|---|
| 36 | Na salt of sulfated oleyl acetate | 1.0 | 400 | 1.0 | CS₂ ___ 10.0 | 40 | 55 | 88 | 145–27 | 3,725 |
| 37 | Na salt of sulfated oleyl acetate | 4.0 | 400 | 2.0 | CS₂ ___ 10.0 | 40 | 30 | 84 | 105–5 | 2,475 |
| 38 | Na salt of sulphated oleyl acetate (+0.35 part HCl) | 4.0 | 400 | 0.5 | PhCH₂SH ___ 0.05 | 40 | 25 | 80 | 103–1 | 3,700 |
| 39 | Na salt of sulphated oleyl acetate (+0.35 part HCl) | 4.0 | 400 | 1.0 | PhCH₂SH ___ 0.2 | 40 | 40 | 86 | 41–1 | 1,850 |
| 40 | Na salt of sulphated oleyl acetate | 3.0 | 300 | 0.5 | HOOCCH₂SH ___ 1.0 | 40 | 60 | 83 | 73–1 | 2,650 |
| 41 | Na salt of sulphated oleyl acetate.₄ | 4.0 | 400 | 2.0 | H₂S ⁵ ___ 1.5 | 40 | 360 | 90 | (⁶) | |
| 42 | Na salt of sulphated oleyl acetate.₄ | 2.0 | 300 | 0.5 | SO₂ ¹ ___ 4.0 | 20 | 60 | 88 | 69–2 | 3,125 |
| 43 | Na salt of sulphated oleyl acetate | 3.0 | 300 | 1.0 | CH₂=C(CH₃)CN ___ 10.0 | 40 | 130 | 90 | 90–3 | 3,050 |
| 44 | Na salt of sulphated oleyl acetate | 3.0 | 300 | 1.0 | CH₂=CCl–CCl=CH₂ 10.0 | | 37 | 88 | 95–9 | 3,100 |
| 45 | Na salt of sulphated oleyl acetate | 4.0 | 233 | 0.75 | Rosin ___ 4.0 | 40 | 120 | 80 | 65–1 | 3,375 |
| 46 | C-cetyl betaine | 3.0 | 300 | 1.0 | | 40 | 270 | 73 | 130–8 | 4,350 |
| 47 | Lauryl methyl glucamine | 3.0 | 300 | 1.0 | | 40 | 330 | 79 | 133–11 | 4,225 |
| 48 | Casein (+0.5 part NaOH) | 4.0 | 300 | 0.75 | (NH₄)₂S₂O₈ ¹ ___ 0.5 | 40 | 210 | 71 | 83–1 | 3,500 |
| 49 | Na salt of polymethacrylic acid | 4.0 | 300 | 0.75 | (NH₄)₂S₂O₈ ¹ ___ 0.5 | 40 | 1,020 | 90 | 172–17 | 4,025 |

¹ These were dissolved in the aqueous phase.
² This acid was prepared according to U. S. Patent 2,046,090 by treatment of cetane with an equimolecular mixture of chlorine and sulphur dioxide, followed by hydrolysis.
³ See footnote ¹ of Table I.
⁴ See footnote ³ of Table I. Example 41 uses 2 parts of the agent.
⁵ The sulphur was dissolved in water solution of Na₂S equivalent to the H₂S to be used and the resulting polysulphide acidified.
⁶ Liquid at 60° C.

The nature and quality of the impurities present in the chloroprene usually have a substantial effect upon the properties of the final product and, in general, its quality improves as the amount of these impurities is decreased. In carrying out the present invention, it is therefore preferable to employ a chloroprene of the highest purity, i. e., one which is substantially free of the impurities mentioned hereinafter, although chloroprene containing up to 0.5% of monovinylacetylene, up to 0.2% of acetaldehyde, and up to 5.0% of dichloro-1,3-butene-2 may be used with good results. Divinylacetylene should be substantially absent. When the emulsifying solutions sensitive to acids are used, and the latices are to be stored for considerable periods, the total concentration of dichlorobutene and other impurities yielding acids on hydrolysis is preferably less than 0.5%. On the other hand, in certain instances, impurities have favorable effects on some properties and may advantageously be added or allowed to remain in these particular cases. For example, divinylacetylene, although undesirable from many points of view, has been observed to improve solvent resistance in certain cases.

Any of the forms of sulphur which are soluble in chloroprene may be used. Ordinarily, the sulphur is dissolved directly in chloroprene before emulsification. It is sometimes more convenient, however, as illustrated in Examples 35 to 37, to dissolve it in a solvent such as carbon disulphide which is then mixed with the chloroprene. Example 41 gives a method of introducing sulphur applicable when hydrogen sulphide is also used. The proportion of sulphur used is ordinarily from about 0.25% based on the chloroprene, up to the maximum amount soluble in the chloroprene at the temperature of polymerization. As illustrated in Examples 15, 16, 36, and 37, increasing the proportion of sulphur within these limits gives products which, when plasticized by Youker's method, are more plastic but have lower tensile strength. Smaller amounts, although operable, in general produce a smaller effect on the properties of the product, although they may sometimes be used to advantage, particularly in connection with modifying agents as described below. It is possible to increase somewhat the amount of dissolved sulphur by mixing with the chloroprene a solvent in which the sulphur is more soluble.

As shown in Examples 38 to 42, the polymerization may also take place in the presence of both sulphur and one or more modifying agents such as are disclosed in Starkweather's U. S. application 69,739, filed March 19, 1936; Starkweather and Collins U. S. applications 69,737 and 156,518, filed March 19, 1936, and July 30, 1937, respectively. The modifying agents disclosed in these three applications are respectively (1) sulphur dioxide and related materials, (2) hydrogen sulphide, and (3) unpolymerizable acid stable organic compounds which form monomolecular addition products with chloro-2-butadiene-1,3 under mild conditions of reaction. Compounds included in this latter class of modifying agents belong to widely different organic chemical groups such as:

1. Unsaturated compounds containing one or more carbonyl groups adjacent to the double bond.
2. Aromatic sulphinic acids.
3. Aromatic mercaptans.
4. Mercapto carboxylic acids.
5. Aliphatic mercaptans.

By way of specific example the following compounds may be mentioned as exemplifying the class: α-naphthoquinone, β-naphthoquinone, benzene sulphinic acid, thiophenol, β-thiophenol, thio-cresol, p-nitro-thiophenol, benzyl mercaptan, thioglycolic acid, ethyl thioglycolate, thiosalicylic acid, benzoquinone, toluene sulphinic acid, naphthaline sulphinic acid, chloro thiophenols, thionaphthols, thioacetic acid, thiomalic acid, etc. In general, it has been found that sulphur and one or more modifying agents may be used in place of any of the modifying agents described in these applications. When these modifying agents are used with sulphur, the polymer isolated from the latex is, in general, soluble and plastic without additional treatment, although it may be made more plastic by milling in the presence of tetramethyl thiuram disulphide or similar reagent. Such polymers may therefore be used (either with or without the additional treatment by Youker's method) in much the same way as unvulcanized natural rubber but are generally unsuitable in the form of latex for direct conversion into thin-walled articles and the like as described for the products of Examples 1 to 12.

Polymerization in the presence of sulphur may also be varied in any of the ways disclosed for the polymerization of chloroprene in the absence of sulphur in U. S. Patent 1,967,861, including polymerization in the presence of inhibitors (see U. S. Patent 1,950,438) and in the presence of solvents, oils, softeners, film-forming materials, and polymerizable compounds (see U. S. Patent 1,967,860). Although tetramethyl and similar thiuram disulphides disclosed in U. S. Patent 1,950,439 greatly inhibit the polymerization of chloroprene in emulsion, other compounds disclosed by Youker, as plasticizers, in his copending application identified above, such as dibenzothiazyl disulphide, do not produce this effect. Hence, for the final production of plastic polymers, they may be added to the chloroprene before polymerization rather than to the finished polymers. The use of solvents (carbon disulphide and hexahydrophenol) is illustrated in Examples 35 to 37 and 5 to 9, of softeners (paraffin) in Examples 5 to 9, and of polymerizable compounds (dichlorobutadiene and methacrylic nitrile) in Examples 9, 43, and 44. The hexahydrophenol and paraffin are sometimes used to improve the stability of the latex toward coagulation. Polymerization in the process of other polymerizable compounds, such as polymerizable compounds containing two carbon atoms in an open chain joined by more than one bond, particularly those named above, has been found to reduce the tendency of both the cured and the uncured polymer to become stiff and hard when kept for long periods at low temperatures. The use of unsaturated nitriles also confers exceptionally good resistance to the swelling action of petroleum distillates. Other polymerizable compounds suitable for use along with chloroprene in the present invention are disclosed in greater detail in U. S. Patents 2,029,410, 2,066,329, 2,066,330, and 2,066,331. When chloroprene and another compound of widely different rate of polymerization are polymerized together, it is often advantageous to add the more rapidly polymerizing one gradually during the course of the polymerization of the other instead of having both present together from the start.

Any emulsifying agent may be used to assist in dispersing the chloroprene but naturally those giving fine and permanent dispersions are preferred. The medium in which the chloroprene is polymerized may be either alkaline, neutral, or acid. Of course, it will be necessary to choose an emulsifying agent which is effective in the medium in which the polymerization is to be carried out. By way of illustration, the following types of emulsifying agents have been found satisfactory.

1. The water soluble salts of carboxylic acids containing long hydrocarbon chains or polycyclic systems. Examples of this class are ammonium oleate, potassium stearate, sodium palmitate, sodium cholate, the soluble sodium salts obtained from shellac, copal, and similar resins, and the agents used in Examples 2, 4, 6, 49, and 13 to 25. The salts of polyhydric alcohol polycarboxylic acid resins described in U. S. Patent 1,967,220 are included in this class.

2. The water soluble salts of sulphonic acids containing long hydrocarbon chains or polycyclic systems, as illustrated in Examples 26 to 29. Another member of this group is the sodium salt of the sulphonic acids used in Examples 7, 8, 12, 41, and 42 and prepared according to U. S. Patent 2,046,757.

3. The water soluble salts of sulphuric acid esters obtainable by sulphation of hydroxy compounds containing long chain hydrocarbons or polycyclic systems, as illustrated in Examples 3 to 5, 7 to 10, and 30 to 45. Soluble salts of the corresponding substituted phosphoric and similar acids, for example, mono- and dilauric phosphates behave similarly.

4. The water soluble salts of nitrogen bases containing long hydrocarbon chains, as illustrated in Examples 11 and 47. Part of this class of emulsifying agents is more fully discussed in the copending patent application of Dales and Downing, Serial No. 128,630, filed March 2, 1937, and includes the internal salts such as the betaines, with the long chain substituent on either the nitrogen or the carbon atom (see Examples 12 and 46).

Still other emulsifying agents, such as the alkaline solution of casein used in Example 48, and the lauryl methyl glucamine

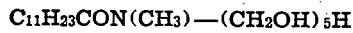

of Example 47 which do not strictly belong to any of the above classes, may also be used to advantage in the present invention, which is not limited to any particular types of emulsifying agents.

As the soluble salts of the above acids, the sodium, potassium, ammonium, and substituted ammonium salts are preferred but the calcium, zinc, magnesium and similar salts, if water soluble, may also be used. These emulsifying agents may, in general, be used in acid, neutral, or alkaline medium except that the salts of the carboxylic acids can not be used in the presence of acids. It is often convenient (for instance in Examples 6 and 18 to 25) to form the emulsifying agent in the emulsion by dissolving suitable quantities of the corresponding acid and base in the water or chloroprene instead of adding the salt itself. It is obvious that in acid media these soluble salts of complex organic acids are present in many cases in the form of the free acids themselves, which are accordingly under these circumstances the actual emulsifying agents. Hence, in these cases the free acid may, if desired, be employed instead of the salt. Where "long hydrocarbon chains" are mentioned above, it is intended to refer to those containing more than about 7 or 8 carbon atoms, and particularly those containing 12 to 18 carbon atoms.

Preferred emulsifying agents are sodium oleate and sodium abietate from the points of view both of economy and efficiency. For special purposes, however, many of the others have definite advantages which may outweigh their higher cost. For example, the sodium salts of sulphated long chain fatty alcohols, which have been purified to remove sodium sulphate and similar impurities, are often preferred in the preparation of latices which may be stored for long periods before use.

The amount of the emulsifying agent used will, of course, depend upon the effectiveness of the particular agents, the concentration of the emulsion and the degree of stability desired. In general, the emulsifying medium used will contain from about 0.2% to 6% of emulsifying agent based on the weight of the emulsifying medium, although still lower or higher amounts may also be used. It is observed, as shown in Examples 35 and 36, that increasing the amount of the emulsifying agent in general increases the speed of polymerization and also the stability of the dispersion. It is also possible to add more emulsifying agent during the course of the polymerization, if desired, either continuously or in one or more batches.

As illustrated in Examples 4, 12, 41, and 42, it is often advantageous to use a mixture of two or more emulsifying agents of different types, provided that the agents selected are not incompatible with one another. Agents of the type of the formaldehyde-naphthalene sulphonic acid condensation product used in Examples 7, 8, 12, 41, and 42 have been found useful in increasing the stability of latices which contain rather high concentrations of electrolytes or which are made by the use of emulsifying agents which are poor dispersing agents for the solid polymer. They are also useful in cases where the latex is to be stored for considerable periods.

Emulsifying agents of the third class above, especially those made from simple long chain alcohols, are particularly suitable for making latices which are to be directly converted into thin-walled articles and the like, while agents of the first class, especially the derivatives of rosin, are particularly suitable both for this purpose and also for making polymers to be plasticized by Youker's method.

It is often advantageous to carry out the polymerization in a medium of different hydrogen ion concentration from that resulting from dissolving the emulsifying and other agents in water. Thus, for many systems, a hydrogen ion concentration exists at which the velocity of polymerization is a maximum. These conditions are present in Example 23, for instance. An acid medium is preferred when modifying agents such as mercaptans are used together with sulphur, since these modifying agents function best in acid media, as already pointed out in the application of Starkweather and Collins, Serial No. 156,518, filed July 30, 1937. On the other hand, a definitely alkaline medium is preferred in the case of emulsifying agents which are sensitive to acid, in order to prevent coagulation during polymerization. The hydrogen ion concentration of the medium also has in many cases an ultimate effect upon the plasticity and other properties of the products prepared by Youker's method. In adjusting the hydrogen ion concentration, it should be borne in mind that hydrogen chloride may be formed during the polymerization. For accurate control, it is sometimes desirable to provide for the neutralization of this acid as the polymerization proceeds. As stated above, the present invention is not limited as to the hydrogen ion concentration of the dispersions.

It is often desirable to accelerate the polymerization of chloroprene in presence of sulphur. This may be done by increasing the reaction temperature or pressure or the concentration of emulsifying agent, or by adjusting the hydrogen ion concentration, or by the choice of emulsifying agent. For a method for employing increased pressure see an article by Starkweather, J. A. S. C. 56, 1870 (1934). Catalysts may also be used effectively for this purpose, such as soluble compounds containing the peroxide nucleus, for example, hydrogen peroxide, benzoyl peroxide, tetralin peroxide, perbenzoic acid, sodium perborate, sodium percarbonate, and ammonium persulphate. Other soluble salts which have been bound effective are potassium permanganate, sodium hypochlorite, potassium chlorate, and potassium ferrocyanide. An effective catalyst, presumably a chloroprene peroxide, is formed progressively when chloroprene is exposed to air. Hence, in order to accelerate polymerization in emulsion the chloroprene may be exposed to air or oxygen (preferably at reduced temperature so as to reduce premature polymerization) before emulsification.

It is possible to further vary the manner of applying the invention by varying the concentration of the chloroprene in the emulsion. It has been found that small amounts of the emulsifying solution give thick emulsions which are difficult to maintain at the desired temperature, while large proportions of solution require inconveniently large reaction vessels and excessive amounts of coagulating agents, although it is possible to use such extreme concentration. It is to be understood, however, that the invention is not limited to the particular concentration of chloroprene used in the examples. The preferred range for the concentration of chloroprene in the emulsions is 20% to 65% but as indicated, other concentrations are within the scope of the invention. High concentrations such as 45–65% are generally preferred when the latex is to be used directly for the production of threads, bands, films and thin-walled articles.

The emulsion of the chloroprene may be prepared in any feasible manner, such as by passing the chloroprene together with the emulsifying liquid through a gear pump or a centrifugal pump or by turbulent flow or by agitating the materials with a paddle or stirrer or by shaking them in a suitable container. It has been found that the best products are obtained if the chloroprene is emulsified to form very fine particles. While about 20° (Example 42) to about 60° C. (Example 20) is the preferred polymerization temperature, it has been found that the polymerization may be effected at temperatures ranging from 0° to 100° C. The rate of polymerization is increased by increasing the temperature as illustrated by Examples 18, 19, and 20. With temperatures below 20° C., however, the polymerization is often inconveniently slow while above 60° C. the reaction may become so rapid as to be hard to control on a large scale. When temperatures above about 40° C. are used for the polymerization, the loss of chloroprene by vaporization is considerable but may be avoided by working in a closed system or by surmounting the vessel in which the polymerization is carried out by a reflux condenser. It has been observed, for instance in Examples 6 and 20, that increasing the temperature of polymerization reduces the tendency of both the cured and the uncured polymer to become stiff and hard when kept for long periods at low temperatures. The process illustrated in the above examples may also be carried out continuously, according to the procedure described in the copending application of Starkweather and Collins already referred to.

The products produced by the process illustrated in the above examples will naturally vary considerably in their characteristics, depending upon the particular conditions employed. The extent of polymerization (proportion of the chloroprene consumed) has been found to be one of the factors which affects the properties of the polymer, particularly its behavior when treated by the process of Youker already referred to. Thus, in Example 13 the lower yield is associated with greater plasticity but somewhat inferior strength. When the polymerization has proceeded to the extent found by preliminary experiments to correspond to the properties desired, it may be stopped by the addition of an antioxidant such as phenyl-beta-naphthylamine or by the addition of one of the compounds disclosed for that purpose in Walker U. S. application, Serial No. 154,212, filed July 17, 1937, or by a combination of these methods. The class of compounds disclosed in application Serial No. 154,212, herein referred to may be described as compound containing the nucleus

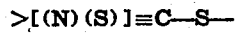

which group is characterized by having a central carbon, one of the valences of which is satisfied by a sulphur atom and the other three valences of which are satisfied by a nitrogen atom and a sulphur atom together. Typical members of this group of compounds which serve to exemplify the class are as follows:

Phenylethyl-carbamyl-dimethyl-dithiocarbamate
Dimethyl-thiocarbamyl-thioacetyl-sulphide
Dimethyl-thiocarbamyl-nitrophenyl-disulphide
Benzothiazyl-dimethyl-dithiocarbamate
Benzothiazyl-dimethyl-carbamyl-sulphide
Benzothiazyl-furoyl-sulphide
Mercapto-benzo-thiazol
Tetrabutyl-thiuram-monosulphide
Tetramethyl-thiuram-disulphide
Dipentamethylene-thiuram-tetrasulphide
Dimethyl carbamyl dimethyl dithiocarbamate
Dinitro phenyl pentamethylene dithiocarbamate
Tetraethyl thiuram disulphide
Dipentamethylene thiuram disulphide
Benzyl pentamethylene dithiocarbamate
Diphenyl diethyl thiuram disulphide
Phenyl dibutyl dithiocarbamate
Tolyl phenyl ethyl dithiocarbamate
b-Phenyl ethyl xylyl methyl dithiocarbamate
p-Diphenyl diisoamyl dithiocarbamate
Propyl dicetyl dithiocarbamate
Crotonyl dicylohexyl dithiocarbamate
Cetyl naphthyl methyl dithiocarbamate
b-Naphthyl dipropyl dithiocarbamate
Decyl benzyl ethyl dithiocarbamate
Benzoyl diethyl dithiocarbamate
Acetyl phenyl methyl dithiocarbamate
Dibutyl carbamyl phenyl propyl dithiocarbamate
p-Acetyl phenyl sulphur diallyl dithiocarbamate
2-Chloro-1-naphthyl sulphur dimethyl dithiocarbamate
Dinaphthyl dimethyl thiuram monosulphide
Dichlor diphenyl diethyl thiuram monosulphide
Dinitro diphenyl dipropyl thiuram monosulphide
Phenyl sodium sulphonate diethyl dithiocarbamate
Nitro ortho diphenyl dimethyl dithiocarbamate
Dipentamethylene thiuram monosulphide
Nitro naphthyl pentamethylene dithiocarbamate
Dinitro diphenyl dibutyl thiuram disulphide
Distearyl dimethyl thiuram disulphide
Tetracetyl thiuram disulphide
Dinaphthyl dimethyl thiuram disulphide
Tetraisopropyl thiuram tetra sulphide
Tetrabrom diphenyl dimethyl thiuram tetra sulphide
Tetrabutyl thiuram disulphide
Potassium nitro benzothiazyl mercaptide
Ammonium chlor nitro benzothiazyl mercaptide
Ethyl benzothiazyl sulphide
Cetyl benzothiazyl sulphide
Crotonyl benzothiazyl sulphide
Benzyl benzothiazyl sulphide
Tolyl benzothiazyl sulphide
Dinitro phenyl benzothiazyl sulphide
Dibrom phenyl benzothiazyl sulphide
b-Naphthyl benzothiazyl sulphide
Nitro p-diphenyl benzothiazyl sulphide
Benzoyl benzothiazyl sulphide
Acetyl benzothiazyl sulphide
Methyl tolyl carbamyl benzothiazyl sulphide
Phenyl benzothiazyl disulphide
Tetrabutyl thiocarbamyl benzothiazyl sulphide
Chloro phenyl propyl thiocarbamyl nitro benzothiazyl sulphide
Dinitro dibenzothiazyl disulphide
Nitro dibenzothiazyl disulphide
Chlor dinitro dibenzothiazyl disulphide Generally, however, where the latex is to be used directly for the production of elastic articles or coatings as described below polymerization is allowed to go to completion and the addition of compounds of the type disclosed in the Walker application becomes unnecessary. In addition to serving to arrest polymerization, both the antioxidant and the compounds disclosed by Walker also serve other purposes, for example, protecting the polymer against the effect of oxygen in the case of the former and, in the case of the latter, assisting to plasticize the polymer according to the process described in the above identified copending application of Youker. The antioxidants which are effective for the protection of natural rubber against the action of oxygen also function in the case of the polymers of the present invention. In addition to phenyl-beta-naphthylamine, the following have been found particularly useful:

N-acetyl-N-phenyl-p-phenylene-diamine
Di-(p-methoxy-phenyl)-amine
Di-phenyl-p-phenylene-diamine
p-Tolyl-sulphonyl-amino-phenyl-p-tolyl-amine
p-Ethoxy-phenyl-beta-naphthylamine
4:4'-Di-anilino symmetrical di-phenyl-thiourea The amounts of antioxidant used in the above examples are generally preferred although greater or less amounts may be used, if desired. The amount of the compound of the type disclosed by Walker for arresting polymerization which may be added, is that given in the examples, but as pointed out above, it is sometimes unnecessary to add these compounds. The copending application of Youker repeatedly referred to describes in somewhat more detail the addition of these compounds as well as of the others suitable for use in his process and points out specifically the preferred range of amounts for the purposes of the process disclosed in his application. Whether one or both agents are used to arrest the polymerization or for other purposes, they are preferably added in the form of an aqueous emulsion. Frequently, they are dissolved in benzene or other suitable solvents before emulsification. The method employed in the above examples is preferred but it will be understood that any other method may be used, if desired.

The coagulation of the latices may in general be brought about by addition of sodium chloride, in some cases with the additional use of an alcohol, as described in the copending application of Calcott and Youker. Many other procedures are available for this purpose, such as the use of other electrolytes and particularly coagulation by exposure of the latex in thin films to low temperatures, as described in the copending application of Calcott and Starkweather, Serial No. 107,332, filed October 24, 1936. In fact, the latices described above are even more suitable for this purpose than those prepared according to the patent applications of Starkweather and Collins already referred to, since the former yield films which are stronger, more rigid, and freer from tack and hence are more easily carried through the washing and drying operations. If Youker's process, mentioned above, is employed, however, these polymers, nevertheless, may be subsequently plasticized.

Although in certain cases there may be some reason for allowing the emulsifying agents to remain in the polymer after coagulation, it is generally preferable to remove substantially all of them before the final milling. This may be accomplished in any desired manner, for example, by washing the polymer with warm water on corrugated rolls, assisting the extraction, if it is desirable, by using a solvent which dissolves the emulsifying agent but not the polymer such as alcohol, acetone, etc. Milling may bring about a sufficient drying of the polymer but where this is not deemed satisfactory the polymer may be additionally dried, for example, by passing it in contact with a current of warm air. Milling on a rubber mill also assists in removing volatile material from the polymer but other means for effecting its removal are often resorted to, for example, washing with water, or with recovered emulsifying solution or with solvents for the material to be removed as is disclosed in the copending application of Calcott and Starkweather, Serial No. 107,332, filed October 24, 1936, and referred to above.

The present invention has been described thus far with particular reference to chloroprene but it is not so limited and is generally applicable to halogen-2-butadiene-1,3 including also such halogen-2-butadienes-1,3 as those in which the hydrogen atom on the third carbon atom of the butadiene group has been replaced by a hydrocarbon group. Thus, chloroprene in the above described invention may, for example, be replaced with bromo-2-butadiene-1,3 or with chloro-2-methyl-3-butadiene-1,3. Chloroprene has, of course, been selected as a basis for the description because the application of the invention to it is a definitely preferred embodiment. It has been stated that the polymerization is to be carried out in an aqueous emulsion but in this respect also the invention is broader, contemplating the use of non-aqueous emulsion media as well as aqueous.

The latices themselves as well as the isolated polymers of the present invention have new and unusual properties. They may be used with or without compounding ingredients, many of which may be added prior to polymerization, if desired. The uses of the dispersion are, however, the same as those of natural rubber latex. Thus, for example, it may be used in the preparation of bands, sheets, and thin-walled articles such as gloves and toy balloons, by depositing the latex on porous forms as described above or by dipping a form of suitable shape into the latex, withdrawing, coagulating, and drying the adhering layer, and, if desired, repeating the process, as described by Kirby in U. S. application 572,739, filed November 2, 1931. The polymer may then be converted by heat to a form resembling well vulcanized natural rubber. Still other methods for utilizing dispersions of chloroprene polymers for making the above articles and also threads, tubing, etc., have been described in British Patent 393,172 and are likewise applicable to the latices of the present invention. Similarly, the latex may be advantageously used for impregnating, coating, or otherwise treating porous or fibrous materials such as paper, cloth, felt, or leather, according, in part, to the teachings of Collins & Larson in U. S. Patent 1,967,863, followed, if desired, by curing by the application of heat. The curing of the coagulated latex may also be brought about very conveniently by the action of sulphur chloride applied either in the form of vapor or in solution in an organic solvent such as benzene, carbon tetrachloride or carbon disulphide. The advantage of the use of sulphur chloride over simple heating of the coagulum is the shorter time and lower temperature required to develop the maximum strength in the product. The latex may also be used as a coating composition and as a bonding agent.

The latex produced according to the present invention has several properties which make it particularly suitable for the above applications and superior to other latices made from chloroprene. Thus, as illustrated by Examples 1 and 2, it gives stronger and more extensible films than those made from polymers in which no sulphur is used. This superiority is particularly great when the films are treated with sulphur chloride vapor or are heated for long periods in air and of course, applies not only to sheets but to any shape in which the material is coagulated. Furthermore, many pigments, such as carbon black and lithopone, have a much more pronounced effect upon the mechanical properties of articles made from the latices of the present invention than upon those made from dispersion of polymers in the preparation of which no sulphur was used. For example, 10 parts of channel black per 100 parts of polymer in the latex of Example 3 raised the tensile strength to 4075 lbs. per sq. in., while 20 parts of lithopone gave 3625 lbs.

The present invention, therefore, provides a method for polymerizing chloro-2-butadiene-1,3 by which both latices and coagulated polymers are produced which have unusual and particularly advantageous properties. Thus, as pointed out above, the latices may be used as such for substantially all of the purposes for which natural rubber latex is used. When so used, these latices exhibit all the known advantages of chloroprene polymer latices over natural rubber latices and, in addition, they require a shorter heating period in order to develop their maximum tensile strength and may be advantageously brought to their maximum tensile strength by the use of sulphur chloride. Furthermore, the finished films in general have considerably higher tensile strength than those made from polymers in the preparation of which no sulphur was used and they are even more resistant to the action of kerosene and similar solvents. Another important advantage of the latex of the present invention is that, as a result of the incorporation of pigments as described above, for example, carbon black, lithopone, and that sold under the trade name, Titanox, the tensile strength of the product is still further increased. In addition, many of the products of the present invention are substantially odorless, unless mercaptans, etc., have been used along with the sulphur.

As stated hereinbefore, the polymers of the present invention are particularly well suited to be plasticized according to the process of Youker, as disclosed in his application to which reference has already been repeatedly made. The wide utility of these polymers, particularly when so plasticized is fully discussed in the Youker application. Some of the polymers of the present invention, for example, those formed in the presence of modifying agents when coagulated are suitable for use as plastic polymers even without plasticization according to Youker's process, although it may, nevertheless, be applied to them to vary their properties. These polymers may, as disclosed above, be used in much the same way as unvulcanized natural rubber and, as disclosed in Starkweather and Collins application, Serial No. 156,518, filed July 30, 1937, for the plastic polymers prepared according to the process of that application.

The polymers of the present invention appear to contain the sulphur in chemical combination. Evidence of this fact is furnished by the results of attempts to extract sulphur from the polymer with a solvent for the sulphur, such as ethyl alcohol or acetone. The sulphur content of the polymer is only slightly reduced by such treatment. The small amount of material extracted appears to be a low polymer of chloroprene containing combined sulphur and not free sulphur itself. As further evidence of the fact that the sulphur is held in chemical combination, it is pointed out that the novel properties exhibited by the latices and coagula obtainable by the process of the present invention are not exhibited by polymers to which sulphur is added after they have been formed nor are these properties exhibited generally by polymers which are formed by polymerizing in the presence of sulphur compounds and retain some of the sulphur compound in chemical combination unless there is also present, during the polymerization, some sulphur, as such. It is to be noted also that, while the polymers of this invention are a chemical combination of polymer and sulphur, previously described sulphur containing polymers formed by emulsion polymerization are a chemical combination of polymer and a sulphur containing compound, such as hydrogen sulphide, sulphur dioxide, and mercaptans, for example.

It is apparent that many widely different embodiments of this invention may be made without departing from the spirit and scope thereof and therefore it is not intended to be limited except as indicated in the appended claims.

I claim:

1. The process which comprises dissolving sulphur in chloro-2-butadiene-1,3, then dispersing the mixture in an aqueous medium, and then polymerizing the chloro-2-butadiene-1,3 while so dispersed.

2. The process which comprises emulsifying in water in the presence of an emulsifying agent, chloro-2-butadiene-1,3 which is substantially free from acetaldehyde, monovinylacetylene, divinylacetylene, and dichloro-1,3-butene-2, and then polymerizing the dispersed chloro-2-butadiene-1,3 in the presence of a quantity of sulphur ranging from about 0.25% of the weight of the chloro-2-butadiene-1,3 up to about the amount soluble in the chloro-2-butadiene-1,3 under the conditions of the polymerization.

3. The process which comprises dissolving in chloro-2-butadiene-1,3 a quantity of sulphur ranging from about 0.25% of the weight of the chloro-2-butadiene-1,3 up to about the amount soluble in the chloro-2-butadiene-1,3 under the conditions of the polymerization, then dispersing the solution in water in the presence of an emulsifying agent and then polymerizing the dispersed chloro-2-butadiene-1,3.

4. The process which comprises dissolving in chloro-2-butadiene-1,3 a quantity of sulphur ranging from about 0.25% of the weight of the chloro-2-butadiene-1,3 up to about the amount soluble in the chloro-2-butadiene-1,3 under the conditions of the polymerization, then dispersing the solution in water in the presence of a sodium salt of a sulphated long chain fatty alcohol and then polymerizing the dispersed chloro-2-butadiene-1,3.

5. The process which comprises dissolving sulphur in chloro-2-butadiene-1,3, then dispersing the mixture in an aqueous medium, then polymerizing the chloro-2-butadiene-1,3 while so dispersed and stopping the polymerization when a product of predetermined properties may be isolated by adding a material adapted to arrest the polymerization.

6. The process which comprises dissolving sulphur in chloro-2-butadiene-1,3, then dispersing the mixture in an aqueous medium, and then polymerizing the chloro-2-butadiene-1,3 while so dispersed and in the presence of a non-polymerizable solvent for the chloro-2-butadiene-1,3.

7. The process which comprises dissolving in chloro-2-butadiene-1,3 a quantity of sulphur ranging from about 0.25% of the weight of the chloro-2-butadiene-1,3 up to about the amount soluble in the chloro-2-butadiene-1,3 under the conditions of the polymerization, then dispersing the solution in water in the presence of an emulsifying agent and then polymerizing the dispersed chloro-2-butadiene-1,3 at a temperature of about 20° C. to about 60° C.

8. The process which comprises dissolving in chloro-2-butadiene-1,3 a quantity of sulphur ranging from about 0.25% of the weight of the chloro-2-butadiene-1,3 up to about the amount soluble in the chloro-2-butadiene-1,3 under the conditions of the polymerization, then dispersing the solution in a quantity of water containing an emulsifying agent such that the concentration of chloro-2-butadiene-1,3 in the resulting dispersion is about 20% to about 65%, based on the weight of the dispersion, and then polymerizing the dispersed chloro-2-butadiene-1,3 at a temperature of about 20° C. to about 60° C.

9. The process which comprises dissolving in chloro-2-butadiene-1,3 a quantity of sulphur ranging from about 0.25% of the weight of the chloro-2-butadiene-1,3 up to about the amount soluble in the chloro-2-butadiene-1,3 under the conditions of the polymerization, then dispersing the solution in a quantity of water containing a small amount of sodium oleate as an emulsifying agent such that the concentration of chloro-2-butadiene-1,3 in the resulting dispersion is about 20% to about 65%, based on the weight of the dispersion, and then polymerizing the dispersed chloro-2-butadiene-1,3 at a temperature of about 20° C. to about 60° C.

10. The process which comprises dissolving in chloro-2-butadiene-1,3 a quantity of sulphur ranging from about 0.25% of the weight of the chloro-2-butadiene-1,3 up to about the amount soluble in the chloro-2-butadiene-1,3 under the conditions of the polymerization, then dispersing the solution in a quantity of water containing a small amount of sodium abietate as an emulsifying agent such that the concentration of chloro-2-butadiene-1,3 in the resulting dispersion is about 20% to about 65%, based on the weight of the dispersion, and then polymerizing the dispersed chloro-2-butadiene-1,3 at a temperature of about 20° C. to about 60° C.

11. The process which comprises dissolving about 0.25 part of sulphur in about 100 parts of chloro-2-butadiene-1,3, then emulsifying the resulting mixture in about 100 parts of water containing about 0.25 part of sodium hydroxide, about 0.25 part of ammonium persulphate and about four parts sodium abietate and then polymerizing the dispersed chloro-2-butadiene-1,3 at a temperature of about 40° C.

12. The process which comprises dissolving about 0.75 part of sulphur in about 100 parts of chloro-2-butadiene-1,3, then emulsifying the resulting mixture in about 233 parts of water containing about four parts of sodium abietate, about 0.25 part sodium hydroxide, and about 0.5 part ammonium persulphate, then polymerizing the dispersed chloro-2-butadiene-1,3 at a temperature of about 40° C., then adding to the dispersion an antioxidant and thereafter coagulating the resulting dispersion.

13. The process which comprises emulsifying chloro-2-butadiene-1,3 in an aqueous medium, and then polymerizing the dispersed compound in the presence of elementary sulphur, the latter being the only sulphur-containing modifier present which is capable of combining with the chloro-2-butadiene-1,3 under the conditions of polymerization.

14. The process which comprises emulsifying, in an aqueous medium, chloro-2-butadiene-1,3 and another polymerizable material containing two carbon atoms in an open chain joined by more than one bond, and then polymerizing the dispersed compound in the presence of elementary sulphur, the latter being the only sulphur-containing modifier present which is capable of combining with the chloro-2-butadiene-1,3 under the conditions of polymerization.

15. The process which comprises dissolving in chloro-2-butadiene-1,3 a quantity of elementary sulphur ranging from about 0.25 per cent of the weight of the chloro-2-butadiene-1,3 to about the amount soluble in chloro-2-butadiene-1,3 under the conditions of polymerization, then dispersing the solution in water in the presence of an emulsifying agent, and then polymerizing the dispersed chloro-2-butadiene-1,3, the elementary sulphur being the only sulphur-containing modifier present which is capable of combining with the chloro-2-butadiene-1,3 under the conditions of polymerization.

16. The process which comprises dissolving in chloro-2-butadiene-1,3 a quantity of elementary sulphur ranging from about 0.25 per cent of the weight of the chloro-2-butadiene-1,3 to about the amount soluble in chloro-2-butadiene-1,3 under the conditions of polymerization, then dispersing the solution in a quantity of water, containing a small amount of a sodium salt of a sulphated long chain fatty alcohol as the dispersing agent, such that the concentration of the chloro-2-butadiene-1,3 in the resulting dispersion is about 20 per cent to about 65 per cent based on the weight of the dispersion, and then polymerizing the dispersed chloro-2-butadiene-1,3, the elementary sulphur being the only sulphur-containing modifier present which is capable of combining with the chloro-2-butadiene-1,3 under the conditions of polymerization.

17. The process which comprises dissolving in chloro-2-butadiene-1,3 a quantity of elementary sulphur ranging from about 0.25 per cent of the weight of the chloro-2-butadiene-1,3 to about the amount soluble in chloro-2-butadiene-1,3 under the conditions of polymerization, then dispersing the solution in a quantity of water, containing a small amount of sodium oleate as the dispersing agent, such that the concentration of the chloro-2-butadiene-1,3 in the resulting dispersion is about 20 per cent to about 65 per cent based on the weight of the dispersion, and then polymerizing the dispersed chloro-2-butadiene-1,3, the elementary sulphur being the only sulphur-containing modifier present which is capable of combining with the chloro-2-butadiene-1,3 under the conditions of polymerization.

18. The process which comprises dissolving in chloro-2-butadiene-1,3 a quantity of elementary sulphur ranging from about 0.25 per cent of the weight of the chloro-2-butadiene-1,3 to about the amount soluble in chloro-2-butadiene-1,3 under the conditions of polymerization, then dispersing the solution in a quantity of water, containing a small amount of sodium abietate as the dispersing agent, such that the concentration of the chloro-2-butadiene-1,3 in the resulting dispersion is about 20 per cent to about 65 per cent based on the weight of the dispersion, and then polymerizing the dispersed chloro-2-butadiene-1,3, the elementary sulphur being the only sulphur-containing modifier present which is capable of combining with the chloro-2-butadiene-1,3 under the conditions of polymerization.

ARNOLD M. COLLINS.